US012613761B1

(12) United States Patent
Panalkar et al.

(10) Patent No.: US 12,613,761 B1
(45) Date of Patent: Apr. 28, 2026

(54) DATA SCIENCE ANOMALY DETECTION

(71) Applicant: BLACKROCK FINANCE, INC., New York, NY (US)

(72) Inventors: Amit Panalkar, Johns Creek, GA (US); Rishab Chauhan, Atlanta, GA (US); Pranay Sharma, New York, NY (US); Earvin Laxamana, New York, NY (US)

(73) Assignee: BlackRock Finance, Inc., New York, NY (US)

( * ) Notice: Subject to any disclaimer, the term of this patent is extended or adjusted under 35 U.S.C. 154(b) by 174 days.

(21) Appl. No.: 18/176,756

(22) Filed: Mar. 1, 2023

Related U.S. Application Data

(60) Provisional application No. 63/416,205, filed on Oct. 14, 2022.

(51) Int. Cl.
*G06F 11/07* (2006.01)

(52) U.S. Cl.
CPC ...... *G06F 11/0769* (2013.01); *G06F 11/0721* (2013.01); *G06F 11/079* (2013.01)

(58) Field of Classification Search
CPC . G06F 11/0769; G06F 11/0721; G06F 11/079
See application file for complete search history.

(56) References Cited

U.S. PATENT DOCUMENTS

| | | | | |
|---|---|---|---|---|
| 9,323,599 | B1 * | 4/2016 | Iyer | G06F 11/30 |
| 11,606,379 | B1 * | 3/2023 | Pratt | H04L 63/1416 |
| 12,190,156 | B2 * | 1/2025 | Mathew | G06F 9/5094 |
| 12,206,693 | B1 * | 1/2025 | Apostolopoulos | |
| | | | | G06F 16/9024 |
| 12,298,840 | B1 * | 5/2025 | Bhatia | G06F 11/0751 |
| 12,373,683 | B2 * | 7/2025 | Muhammad | G06N 3/044 |
| 2011/0128374 | A1 | 6/2011 | Shellshear et al. | |
| 2013/0198119 | A1 | 8/2013 | Eberhardt, III et al. | |
| 2017/0063890 | A1 * | 3/2017 | Muddu | G06N 5/022 |
| 2017/0185470 | A1 * | 6/2017 | Höfig | G06F 11/008 |
| 2019/0155672 | A1 * | 5/2019 | Wang | G06F 11/079 |
| 2019/0294524 | A1 * | 9/2019 | Gupta | G06F 11/364 |
| 2020/0096566 | A1 | 3/2020 | Naohara et al. | |
| 2020/0285737 | A1 * | 9/2020 | Kraus | G06F 21/552 |
| 2020/0296124 | A1 * | 9/2020 | Pratt | H04L 63/20 |
| 2021/0209486 | A1 * | 7/2021 | Fan | G06N 20/20 |

(Continued)

FOREIGN PATENT DOCUMENTS

| | | | |
|---|---|---|---|
| CN | 111062590 A | 4/2020 | |
| WO | WO-2018233889 A1 * | 12/2018 | ......... G06F 11/0739 |
| WO | WO-2020019403 A1 * | 1/2020 | |

OTHER PUBLICATIONS

Kumar, "5 Anomaly Detection Algorithms Every Data Scientist Should Know," Dec. 13, 2021, 7 pages.

*Primary Examiner* — Ashish Thomas
*Assistant Examiner* — Indranil Chowdhury
(74) *Attorney, Agent, or Firm* — Haynes and Boone, LLP

(57) ABSTRACT

A system, method, and a computer program product for determining anomalies in a dataset are provided. The dataset, which stores data structures of parameters, is received at an anomaly detection framework. The anomaly detection framework selects multiple models, including time series models, historical models, artificial intelligence models and isolation forest models to analyze the parameters in the dataset and determine anomalies in the data structures.

20 Claims, 10 Drawing Sheets

500

Receive a dataset at an anomaly detection framework — 502

Determine a first anomaly detection output for a data structure in a dataset using a first anomaly detection model — 504

Determine a second anomaly detection output for the data structure in the dataset using a second anomaly detection model — 506

Determine a third anomaly detection output for the data structure in the dataset using a third anomaly detection model — 508

Determine a fourth anomaly detection output for the data structure in the dataset using a fourth anomaly detection model — 510

Determine that the data structure includes an anomaly using the first anomaly detection output, the second anomaly detection output, the third anomaly detection output and the fourth anomaly detection output — 512

Generate an alert indicating an anomaly — 514

(56) References Cited

U.S. PATENT DOCUMENTS

| | | | |
|---|---|---|---|
| 2021/0264306 A1* | 8/2021 | Baran Pouyan | G06N 7/01 |
| 2022/0382622 A1* | 12/2022 | Ye | G06F 11/0709 |
| 2023/0110056 A1* | 4/2023 | Gullikson | G05B 23/0283 |
| | | | 700/80 |
| 2024/0126630 A1* | 4/2024 | Nagar | G06F 11/0721 |
| 2025/0036500 A1* | 1/2025 | Ono | G06F 11/0751 |
| 2025/0278342 A1* | 9/2025 | Chintakunta | G06F 11/302 |

* cited by examiner

100

200

Data Sources
110

Anomaly Detection Framework 108

Data Processor
201

Scoring Model
202A

Isolation Forest Model
202B

Isolation Forest Lookback Model 202C

Time Series Model
202D

Local Outlier Factor Model 202E

Local Selective Combination in Parallel Outlier Model 202F

Local Outlier Factor Model 202E

K-Nearest Neighbors Model 202G

Deep Autoencoders Model 202H

Analytics Module
204

Alert Module
206

Anomaly Alert
208

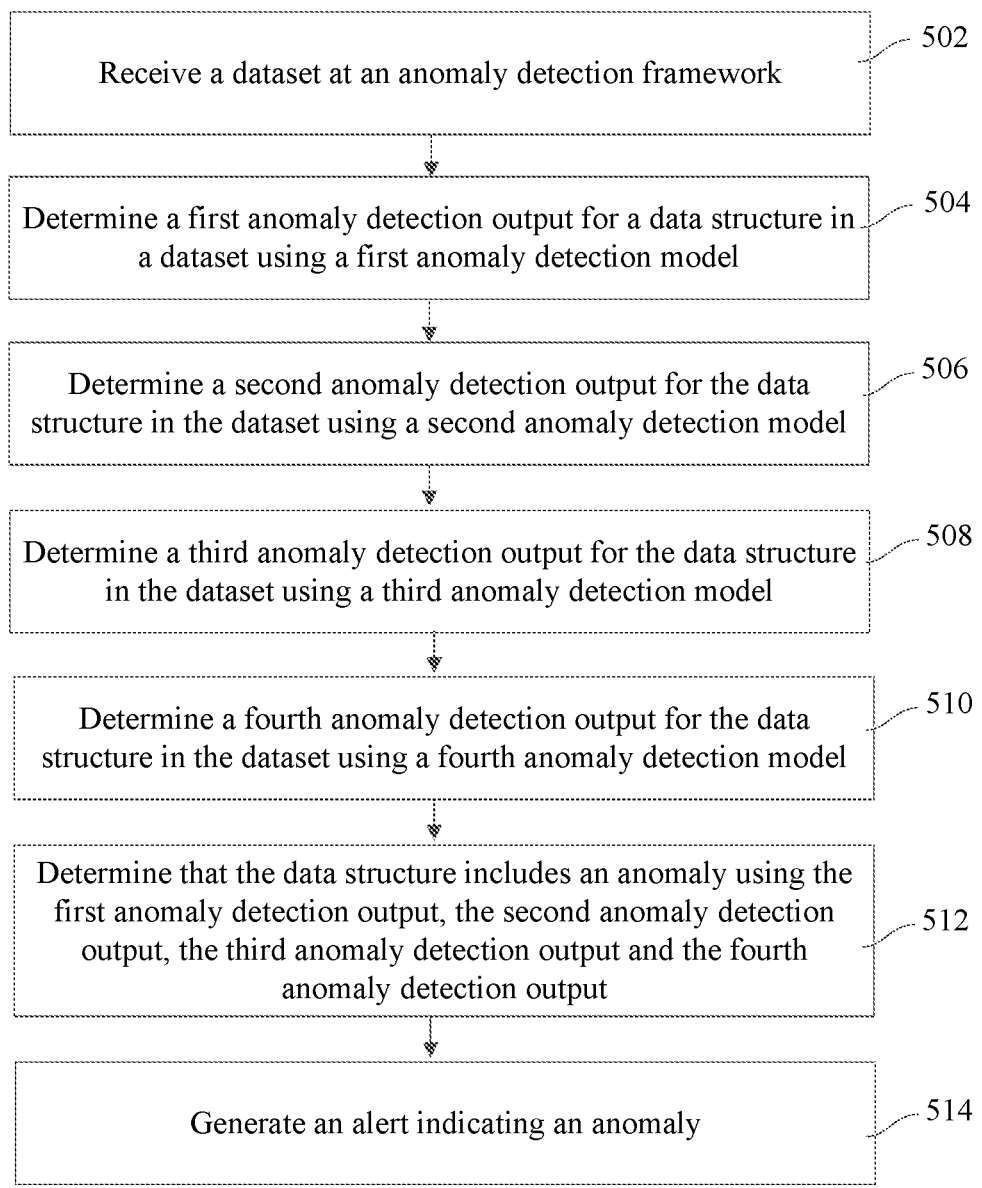

Receive a dataset at an anomaly detection framework — 502

Determine a first anomaly detection output for a data structure in a dataset using a first anomaly detection model — 504

Determine a second anomaly detection output for the data structure in the dataset using a second anomaly detection model — 506

Determine a third anomaly detection output for the data structure in the dataset using a third anomaly detection model — 508

Determine a fourth anomaly detection output for the data structure in the dataset using a fourth anomaly detection model — 510

Determine that the data structure includes an anomaly using the first anomaly detection output, the second anomaly detection output, the third anomaly detection output and the fourth anomaly detection output — 512

Generate an alert indicating an anomaly — 514

Compare parameters in a data structure to parameters in other data structures ⟋ 602

Generate a parameter score for each compared parameter ⟋ 604

Aggregate the parameter scores into an aggregated parameter score ⟋ 606

Generate an anomaly detection output that indicates an anomaly based on the aggregated parameter score and the parameter score threshold ⟋ 608

<u>700</u>

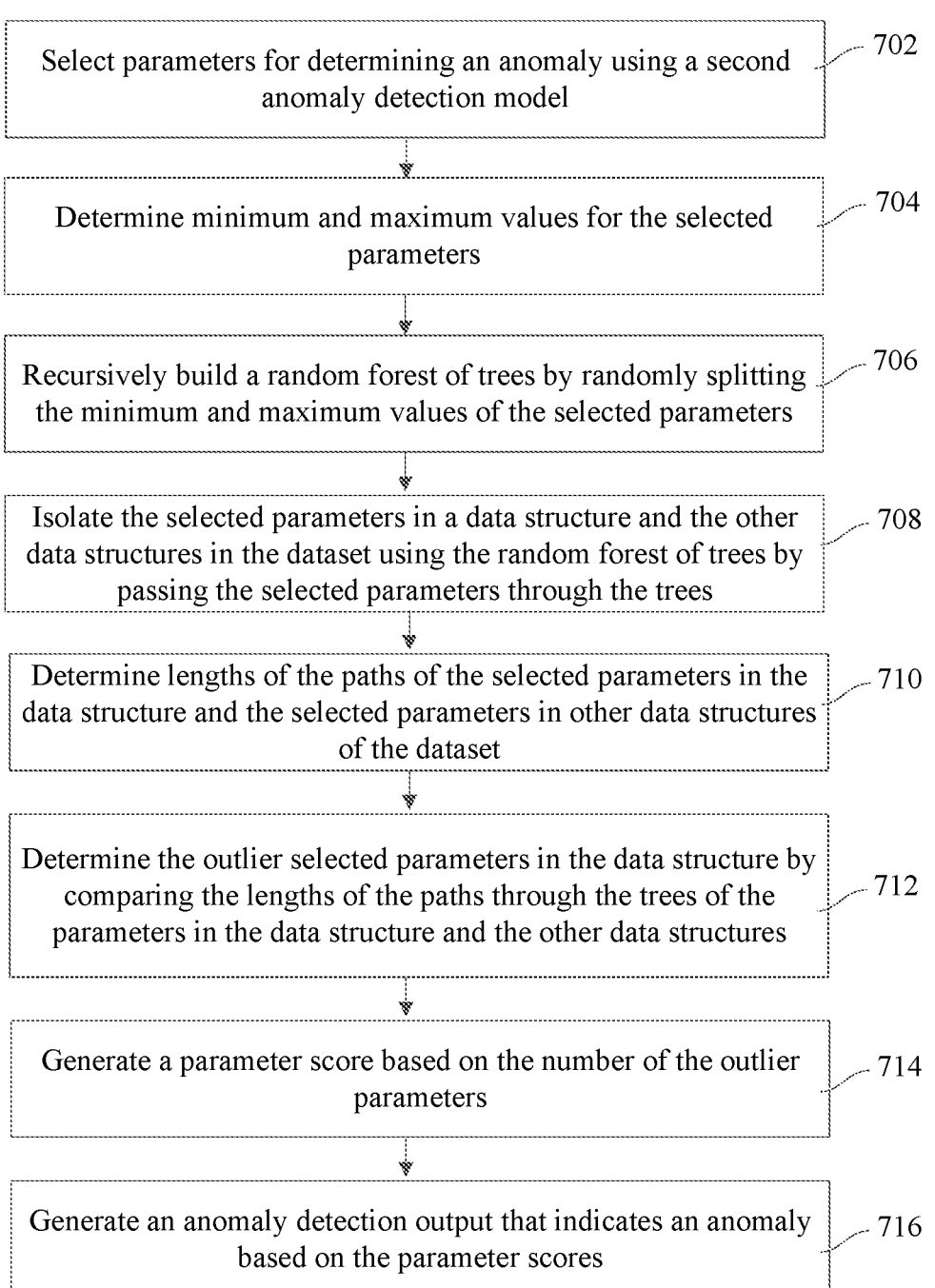

Select parameters for determining an anomaly using a second anomaly detection model ⟍ 702

Determine minimum and maximum values for the selected parameters ⟍ 704

Recursively build a random forest of trees by randomly splitting the minimum and maximum values of the selected parameters ⟍ 706

Isolate the selected parameters in a data structure and the other data structures in the dataset using the random forest of trees by passing the selected parameters through the trees ⟍ 708

Determine lengths of the paths of the selected parameters in the data structure and the selected parameters in other data structures of the dataset ⟍ 710

Determine the outlier selected parameters in the data structure by comparing the lengths of the paths through the trees of the parameters in the data structure and the other data structures ⟍ 712

Generate a parameter score based on the number of the outlier parameters ⟍ 714

Generate an anomaly detection output that indicates an anomaly based on the parameter scores ⟍ 716

Collect an anomaly detection output for a data structure from another model over a historical time period — 802

Determine a number of times the data structure included an anomaly over the historical time period — 804

Generate an anomaly detection output that indicates an anomaly based on the number of times the data structured was determined to be anomalous — 806

900

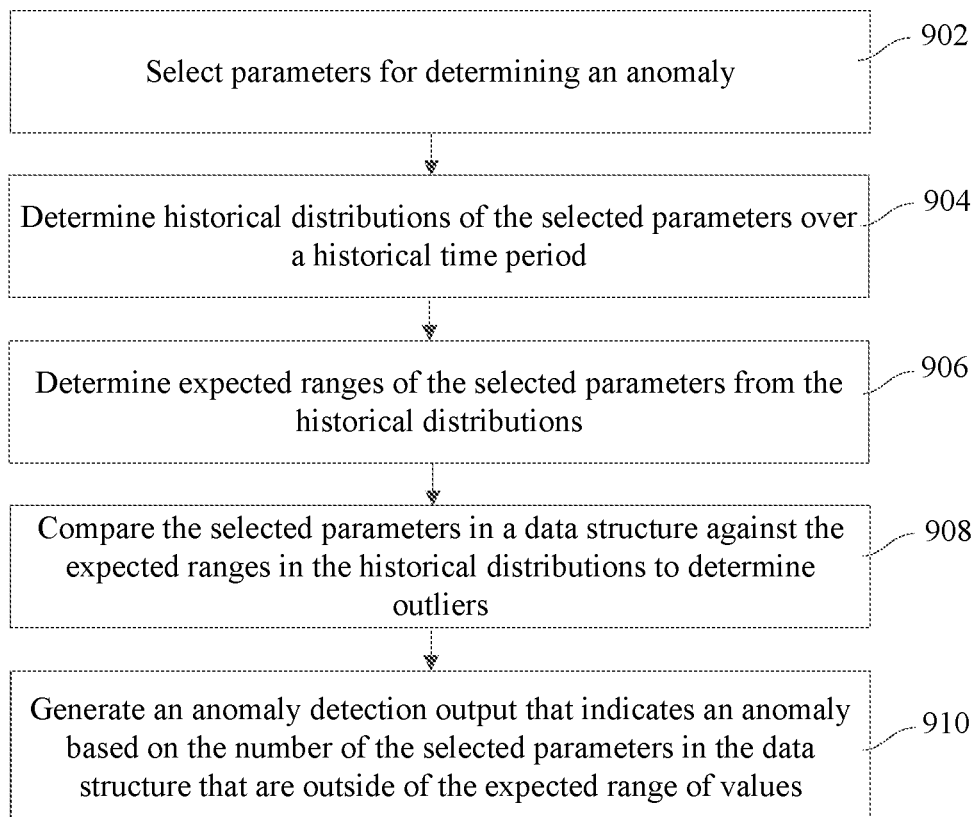

Select parameters for determining an anomaly — 902

Determine historical distributions of the selected parameters over a historical time period — 904

Determine expected ranges of the selected parameters from the historical distributions — 906

Compare the selected parameters in a data structure against the expected ranges in the historical distributions to determine outliers — 908

Generate an anomaly detection output that indicates an anomaly based on the number of the selected parameters in the data structure that are outside of the expected range of values — 910

FIG. 9

DATA SCIENCE ANOMALY DETECTION

CROSS-REFERENCE TO RELATED APPLICATION

The present application claims priority to U.S. Provisional Application No. 63/416,205 filed on Oct. 14, 2022, the benefit of which is claimed and the disclosure of which is incorporated herein by reference in its entirety.

TECHNICAL FIELD

The embodiments are directed to anomaly detection, and more specifically to using multiple anomaly detection models to detect anomalies in data.

BACKGROUND

Anomaly detection process is often a rule-based approach where an anomaly in data is detected by presence or absence of parameters, parameter values, etc., that fit a predefined set of rules. Such rule-based models may be inaccurate and may need frequent updates to rules in light of changing or new parameters and new values.

BRIEF DESCRIPTION OF THE DRAWINGS

FIG. 2 is a diagram of an anomaly detection framework, according to some embodiments.

FIG. 5 is a simplified diagram of a method for determining an anomaly in data, according to some embodiments.

FIG. 7 is a simplified diagram of a method for determining an anomaly in data using an isolation forest model, according to some embodiments.

FIG. 9 is a simplified diagram of a method for determining an anomaly in data using a time series anomaly detection model, according to some embodiments.

In the figures, elements having the same designations have the same or similar functions.

DETAILED DESCRIPTION

The embodiments are directed to an anomaly detection framework. The anomaly detection framework may detect anomalies in data. Unlike conventional systems that detect anomalies using a rules-based approach and often where the ground truth is available, the anomaly detection framework discussed herein may detect anomalies without the ground truth. This is particularly beneficial in systems where the ground truth is not available, is expensive or difficult to calculate, or frequently changes.

The anomaly detection framework discussed herein may be implemented using multiple anomaly detection models. Depending on the accuracy parameters, time constraints, available memory, and computing capabilities, anomaly detection framework may be implemented using all or a subset of the anomaly detection models. The anomaly detection models may also execute sequentially or in parallel. Further, different anomaly detection models may be selected and implemented by the anomaly detection framework. The anomaly detection models may include parameter scoring models, isolation forest models, historical models and time series models. Each of the anomaly detection models that detects anomalies in data may generate an anomaly score. The anomaly detection framework may aggregate the scores from the various anomaly detection models. The anomaly detection framework may also generate an alert that indicates that data may include an anomaly. The details of the models are discussed below.

As used herein, the term "module" or "framework" may comprise hardware or software-based framework that performs one or more functions.

Figure 1:
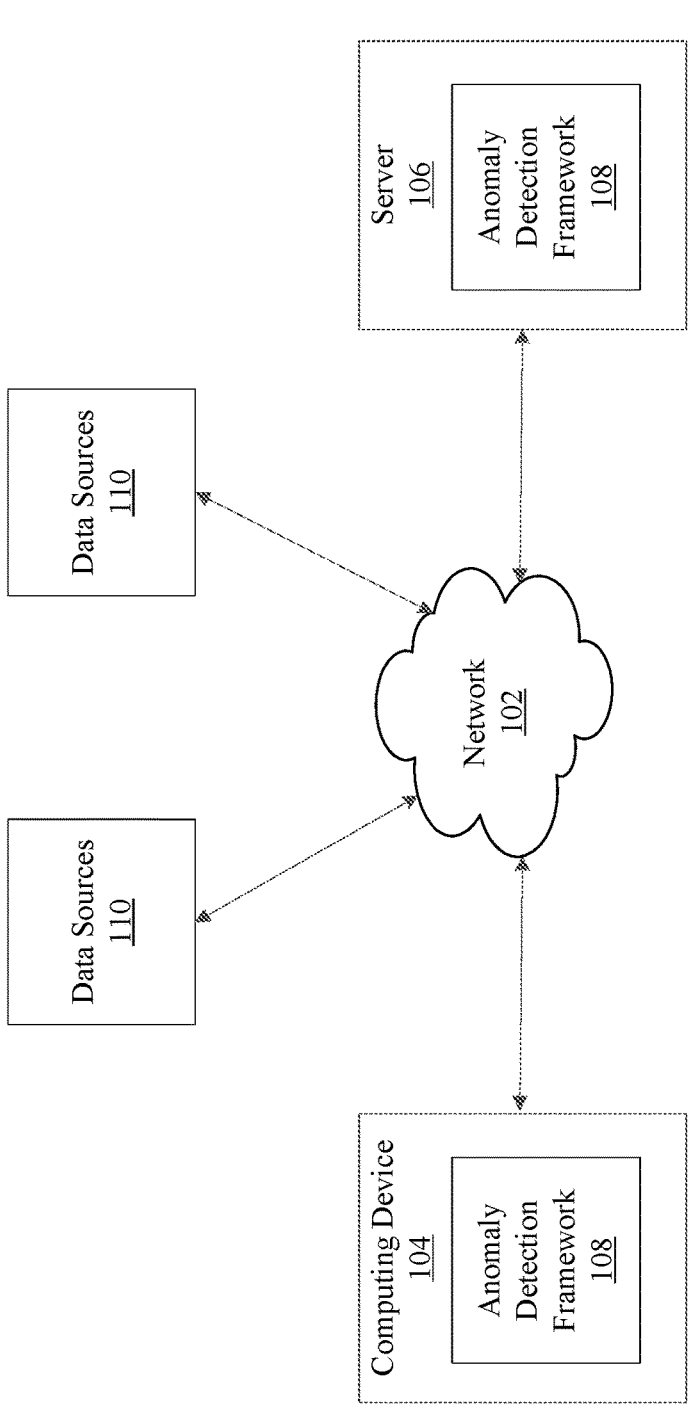
FIG. 1 is a simplified diagram of a computing device that implements an anomaly detection framework, according to some embodiments.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network. Network 102 may be accessible by various components of system 100.

System 100 also includes one or more computing devices 104 and servers 106, although only one of each is shown. Computing devices 104 may be portable and non-portable electronic devices under control of a user and configured to transmit, receive, manipulate data, execute various applications, and communicate with other devices connected to network 102. Example computing devices 104 may be desktop computers, laptop computers, tablets, smartphones, wearable computing devices, eyeglasses that incorporate computing devices, implantable computing devices, etc.

In some embodiments, network 102 may also include servers 106. Servers 106 may be computer software programs or hardware devices that allow computing devices 104 to access centralized applications, provide processing capabilities and facilitate distribution of data throughout network 102.

Computing devices 104 and servers 106 may store and execute an anomaly detection framework 108. Anomaly detection framework 108 may be implemented in software and/or hardware that has sequential and parallel processing capabilities. Anomaly detection framework 108 may receive data from various data sources 110 connected to network 102 and may detect anomalies in data. The data may be a dataset of structured data that anomaly detection framework 108 may receive continuously or in time increments. Further, anomaly detection framework 108 may detect anomalies in data that may or may not have a ground truth.

In some embodiments, anomaly detection framework 108 may execute on one or more computing devices 104 or servers 106. In other embodiments, anomaly detection framework 108 may execute in part on one or more computing devices 104 and in part on one or more servers 106. In some instances, a user interface portion of anomaly detection framework 108 that displays the anomalous data or alerts that include information associated with the anomalous data may execute on the computing device 104 and an analytics portion that identifies the anomalous data may execute on the server 106. Anomaly detection framework 108 with different components or modules executing on computing device 104 and server 106 may include a communication interface for receiving and transmitting data between the components or modules of anomaly detection framework 108.

Data sources 110 may be sources of data that the anomaly detection framework 108 may analyze to detect the anomalies. The data may be transaction data, medical data, health data, computer network data, sensor data, maintenance data, securities data, fund data, and other types of structured data. The data may be generally associated with the data source 110 that generates and/or processes the data. For example, data source 110 that is a transaction processor may include electronic transaction data associated with electronic transactions, such as payments for goods or services, mortgage payments, credit or debit card charges, and the like. For data source 110 that is a medical system, the data may include a patient's health data, insurance data, treatment data, medical device data, and the like. For data source 110 that is a computer network, the data may include data generated by the operating systems, data transmitted over a network, server data, and the like. For data source 110 that processes vehicle data, such as autonomous vehicles data, the data may be vehicle location, radar, lidar, and other types of sensor data. For data source 110 that is a manufacturing system, the data may be sensor data, assembly line data, robotics data, maintenance data, and the like. For data source 110 that is a trading system or a portfolio management system, the data may be securities, mutual funds, and the like. Notably there may be other data sources 110 and data that are not described herein for which anomaly detection framework 108 may detect anomalies.

The data from data sources 110 may be structured data that is transmitted as data structures that store parameters. The values of these parameters and the ranges of the parameters may not be known to anomaly detection framework 108. Accordingly, anomaly detection framework 108 may identify anomalies without knowing or being preprogrammed with the ground truth or expected values for the data.

As discussed above, anomaly detection framework 108 may receive and analyze the data from data sources 110 to identify anomalies in the data. FIG. 2 is a block diagram 200 of an anomaly detection framework, according to some embodiments. The anomaly detection framework 108 may include a data processor 201, various anomaly detection models 202A-H, an analytics module 204, and an alert module 206. Anomaly detection framework 108 may receive a dataset that includes data structures continuously or at predefined time intervals. These data structures may include parameters. Anomaly detection framework 108 may analyze the data structures in the dataset to determine anomalies in the data structures and/or the parameters.

The data processor 201 may receive data from data sources 110 and may parse the data structures in the dataset. The parsing may determine that the data includes predefined parameters and that those parameters have values. In some instances, data processor 201 may also include cohort logic. The cohort logic may divide the dataset into groups or cohorts. The cohort logic may be predefined using a user interface of computing device 104, a configuration file, and the like. The cohort logic may also depend on a type of data, such as discrete categorical data. For example, the cohort logic may divide the transaction data by one or more of monetary amount ranges, country, area code, credit card company, bank affiliation and the like. The cohort logic may divide health data by one or more types of an issue, treatment, diagnoses, diagnostic results, etc. The cohort logic may divide network data by one or more of an Internet Protocol (IP) address, transmission time, application associated with the data, and the like. The cohort logic may divide the vehicle data by one or more of a location, time of day, sensor data, and the like. The cohort logic may divide the manufacturing data by one or more of a time, temperature, sensor data, facility data, and the like. The cohort logic may divide the fund data by various parameters relating to security lending behavior and asset behavior. Once data is divided into cohorts, the data in each cohort may be passed to anomaly detection models 202A-H to detect anomalies in each cohort either sequentially or in parallel. In the embodiments where data processor 201 does not include the cohort logic, the data that is parsed may be passed to models 202A-H as one cohort.

Anomaly detection models 202A-H may detect an anomaly in the dataset individually and as a combination. Typically, anomaly detection framework 108 may select a subset of models 202A-H, such as models 202A-D to determine the anomalies in the dataset, or another subset of models 202A-H. Anomaly detection framework 108 may select the subset of models 202A-H based on datasets, computing efficiency, parallel processing capability, amount of data in the datasets, and other criteria.

Model 202A may compare the parameters in the data structure with the parameters in other data structures and generate a score based on the comparison. The parameters for determining the anomalies, the number of the parameters, and the type of the parameters may be predefined and may be stored in a configuration file, within model 202A or be received via a user interface. When model 202A receives data in a cohort or the parsed data in the dataset, model 202A may select parameters in the data structures for determining anomalies. Model 202A may then compare the selected parameters in the data structure to the selected parameters in the other data structures. The comparison may determine whether the parameters in the data structure are in the outlier range, e.g., within the five percent of the worst values for the parameters in other structures in the dataset or within another outlier range that may be specified in a configuration file.

In some embodiments, model 202A may generate a score for each selected parameter in the data structure that model 202A has identified as being an outlier. Model 202A may then aggregate the scores for the selected parameters to generate an aggregate score for the data structure. Model 202A may repeat the process for each or some data structures in the dataset to determine scores for the data structures. Model 202A may categorize the data structures with scores above a predefined score threshold as data structures that include anomalies.

Model 202B may be an isolation forest model that isolates observations. Model 202B may select parameters in the data structures of the dataset either randomly, via a configuration file or by receiving the selections via the user interface, to build a forest of trees. The dataset that model 202B uses to build the forest of trees may be a historical dataset. Model 202B may identify the minimum and maximum values of the selected parameters in the dataset. Model 202B may then build the random forest of trees by randomly splitting the values of the parameters between the maximum and minimum values and including the split values into the nodes in the trees as decision data points. The recursive partitioning or splitting of the parameters builds the tree structures, or trees in the random forest of trees.

Once the random forest of trees is generated, model 202B may isolate parameters in the data structures of the dataset model 202B receives from data sources 110. For example, model 202B may pass the selected parameters of the data structures through the random forest of trees to determine the path lengths from the root node to the end node in each tree, some trees or all trees in the random forest of trees. The path lengths from multiple parameters may be averaged over a forest of random trees, e.g., thirty trees, that split different parameters in the dataset. The path average may be a measure of normality, e.g., data without anomalous parameters. The anomalies in the dataset may be captured because the anomalous parameters in the data structures typically may be isolated in fewer than the average number of splits.

When model 202B receives data structures in a dataset as a cohort or a parsed dataset, model 202B may determine whether each data structure includes an anomaly. For example, model 202B may use the forest of random trees to process the selected parameters in each data structure from the root to the end node of the trees. Based on the length of the tree paths, model 202B may identify the parameters in the data structure that are anomalous or not anomalous. For example, if the tree path for a parameter in the data structure reaches the end node of the tree using a path that is less than an average path, model 202B may identify that parameter in the data structure as an anomalous parameter. In some instances, model 202B may generate a score for parameters in the data structure that model 202B identifies as anomalous. Model 202B may then aggregate the scores for each parameter in the data structure that model 202B determined as anomalous to determine whether the scores are above a predetermined score threshold. Based on whether the score is above or below the threshold, model 202B may identify the data structure as anomalous or not anomalous. Model 202B may repeat the process for the data structures in each cohort or in the dataset.

Figure 3:
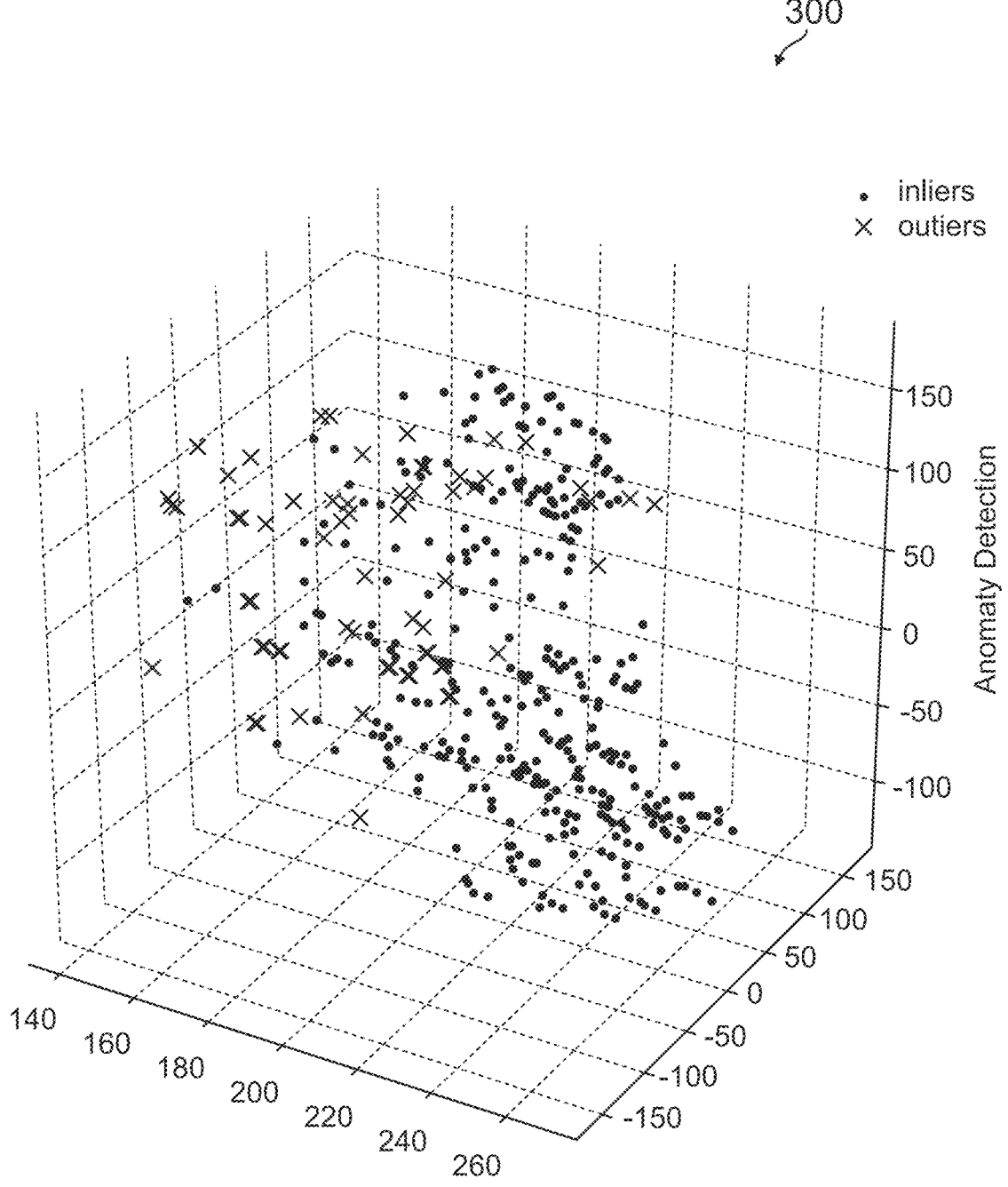
FIG. 3 is a diagram of a visual representation of an output generated using an isolation forest model, according to some embodiments.

FIG. 3 is a diagram 300 of an output of an isolation forest model, according to some embodiments. FIG. 3 illustrates an output of the isolation forest model (model 202B) that indicates whether the data structure in the dataset are anomalous (outliers) or not anomalous (inliers) based on three parameters. In some embodiments, the anomaly detection framework 108 may cause the computing device 104 discussed in FIG. 1 to generate and display a three-dimensional graph where each dimension corresponds to one of the parameters, and includes the output of the isolation forest model for each data structure as a data point in the three-dimensional graph. The data points may visually represent the data structures that are anomalous or not anomalous. Further, the anomaly detection framework 108 may format the data points that are anomalous and not anomalous differently on the display. For example, the anomalous and not anomalous data points may have different shapes, sizes, color, etc. Further, although FIG. 3 illustrates a three-dimensional graph of the dataset, the embodiments are not limited to a three-dimensional graph, and other types of graphs (e.g., with different number of dimensions) or a combination of graphs may also be generated to display data points for anomalous and/or not anomalous data structures.

Going back to FIG. 2, model 202C may be a historical or lookback isolation tree forest model. Although the embodiments are described with respect to the historical isolation forest model, model 202C may be any type of a historical model. Model 202C may process historical data from data sources. For example, data sources may generate datasets at predefined time intervals, such as daily, weekly, monthly, etc. Model 202C may aggregate the data over a predefined historical time period, such as over a period of a week or a month, and then analyze the aggregated data. For example, model 202C may use the random forest trees discussed with respect to model 202B to analyze data over the predefined historical time period. Alternatively, model 202C may store the outputs of model 202B (or another model) over the predefined historical time period. Model 202C may then determine the number of times the same data structures or parameters within the same data structures were anomalous over the predefined historical time period. If the parameters was flagged as anomalous more than a threshold number of times over the predefined historical time interval, model 202C may identify the data structure as anomalous.

For example, when model 202C receives data from a cohort or just parsed data in the parsed dataset, model 202C may use the forest of random trees to analyze various parameters in the data structures from the root of the trees to the end node of the trees. Based on the length of the paths, model 202C may identify the data structures as anomalous or not anomalous. For example, if the tree paths for parameters in the data structure is a less than the average paths in the random tree forest, model 202C may determine that the parameters includes anomalous values. Model 202C may repeat the process for the selected parameters over the predefined historical time period. Alternatively, model 202C may store the results of model 202B over the predefined historical time period, e.g., the data structures that model 202B deemed anomalous, and then analyze the results to determine whether the data structures were flagged as anomalous more than a threshold number of times during the predefined historical time period. Model 202C may then generate a score indicating whether the data structure is anomalous or not anomalous.

Model 202D may be a time series model. Model 202D may store the historical values of the one or more parameters in the dataset over a predefined historical time period, such as three months. The parameters that model 202D may analyze may be predefined using a configuration file, stored within model 202D, or be received via a user interface, in some embodiments. Model 202D may use the parameters in the historical datasets to generate historical distributions of the parameters over the predefined historical time period. From the historical distributions, model 202D may identify an expected range of values for the parameters that indicate anomalous and non-anomalous data. For example, in some embodiments, model 202D may designate an expected range for parameters in the historical dataset to fall within the 25% to 75% of the values of the parameters. Accordingly, the values of the parameters that fall within the expected range indicate non-anomalous data, and values of the parameters that fall outside the expected range, e.g., between 0 and 25% and 75% and 100% indicate anomalous data.

When model 202D receives the current dataset either in a cohort or the parsed dataset, model 202D may compare the values of the parameters in the data structure in the dataset to the historical values for that data structure. Based on whether the values of the parameters fall or do not fall within the expected range determined by the historical distribution, model 202D may generate a score that identifies the data structure as anomalous or not anomalous.

In some embodiments, model 202D may generate a score for each selected parameter in the data structure that model 202D has identified as being an outlier, that is, as falling outside of the expected range. Model 202D may then aggregate the scores for the selected parameters to generate an aggregate score for the data structure. Model 202D may repeat the process for each or some data structures in the dataset to determine scores for the data structures. Model 202D may categorize the data structures with scores above a predefined score threshold as data structures that include anomalies.

Figure 4:
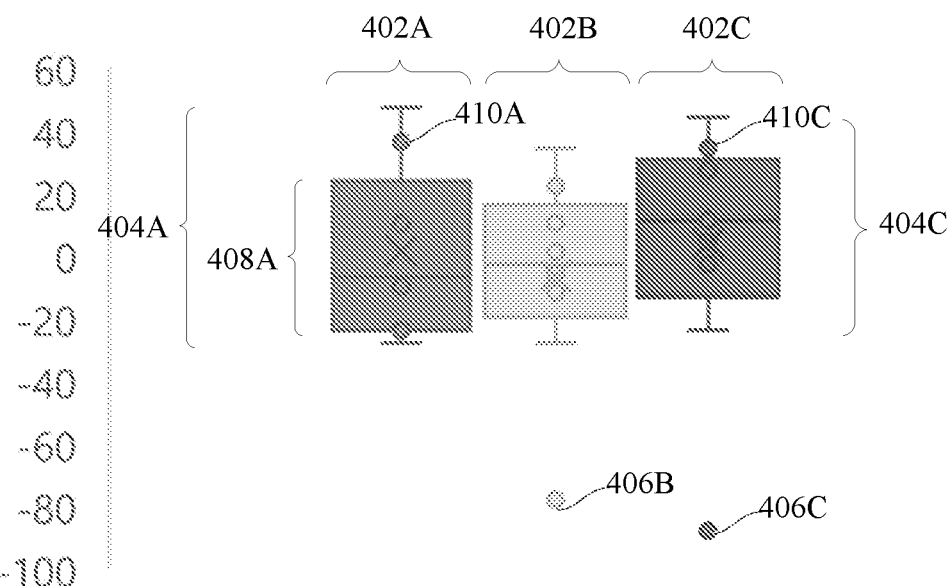
FIG. 4 is a diagram of an output of a time series model, according to some embodiments.

FIG. 4 is a diagram 400 of an output of a time series model, according to some embodiments. In FIG. 4, the time series model (model 202D) generates three plots 402A, 402B, and 402C, where each plot corresponds to a parameter in a data structure of a dataset over a predefined historical time period. Plots 402A-C may be generated on a display of computing device 104. The height of each plot corresponds to the range of values for a corresponding parameter. For example, a height 404A of plot 402A corresponds to a range of values for a parameter that are between 50 and –25. In another example, a height 404C of a plot 402C corresponds to a range of values for a parameter that are between 45 and –20. A data point 406C may identify a value for a parameter corresponding to plot 402C, and a data point 402B may identify a value for a parameter in plot 402B. The rectangular box in each on of plots 402A-C indicates an expected range of values for parameters that model 202D may consider to be inliers and are not anomalous. For plot 402A, the box 408A indicates that the parameter values that are between –20 and 20 are inliers, while values that fall outside of the box 408A are outliers and are anomalous. Data point 410A, for example, may be an outlier for the parameter corresponding to plot 402A and data point 410C may be an outlier for the parameter corresponding to plot 402C. Model 202D may identify data points that are outliers when one or more parameters in the corresponding plots 402A-C are outside of the inline range, that is outside of the corresponding rectangular boxes, e.g., 408A, in FIG. 4. Model 202D may also generate plots 402A-C and corresponding data points 406 and 410 in different colors with each color corresponding to a particular parameter.

Model 202E may be a local outlier factor (LOF) model. Model 202E may use an unsupervised anomaly detection algorithm which computers a local density deviation of a given data point with respect to its neighbors. The data points may be one or more features in the data. Model 202E may identify anomalies as features that correspond to data points that have lower density than its neighbors. Model 202E may generate a score that identifies the data is anomalous or not anomalous.

Model 202F may be a locally selective combination in parallel outlier ensembles (LSCP) model. Model 202F may define a local region around a test instance, e.g., a parameter in the dataset, using the consensus of its nearest neighbors in randomly selected feature subspaces. The top-performing base detectors in this local region are selected and combined as the model's final output. Model 202F may be an unsupervised data model. The number of bins that may select a local region may be predefined in the configuration file or via a user interface. In some instances, the number of bins may be fifty. Further, the proportion of the outliers, e.g., the anomalies in the parameters in dataset may also be configured in a configuration file or via a user interface, and may be a percentage, such as five percent. Model 202F may generate a score that identifies the data as anomalous or not anomalous.

Model 202G may be a K-Nearest Neighbors (KNN) model. Model 202G may define outliers by finding out the distance to the kth nearest neighbor. Model 202G may use the distance as the outlier score mean. The observations with high outlier score mean may be flagged as anomalies. Model 202G may be configured to determine a distance to a predefined number of neighbors, e.g., twenty neighbors, and may have the proportion of outliers, e.g., anomalies in the dataset to five percent. Both the predefined number of neighbors and the proportion of outliers may be configured in a configuration file, via a user interface, or be stored in model 202G. Model 202G may generate a score that identifies the data as anomalous or not anomalous.

Model 202H may be a deep autoencoder model that is an unsupervised neural network learning model. Model 202H may include an encoder and a decoder. The encoder receives the parameters in the data structures in the cohorts or the parsed data structures and generates a latent-space representation of the parameters. The decoder receives the latent representation of the parameters and attempts to reconstruct the latent representation into the parameters. Model 202H may then determine a mean square error between the parameters that were an input and output of the autoencoder. Model 202H may flag the observations with the highest mean squared error between the encoder input and decoder output as outliers. The parameters of the autoencoder may be configured using a configuration file or via the user interface. The parameters may include a proportion of outliers, e.g., anomalies in the parameters set to five percent, an encoder that may create a bottleneck by having a receiving layer that has 64 inputs and an output layer that has 16 outputs into the latent space. Similarly, the decoder may be configured to have an input layer that has 16 inputs and an output layer that has 64 outputs. The activation function in the encoder and the decoder may be a sigmoid function. Model 202H may generate a score that identifies the data is anomalous or not anomalous.

Once models 202A-H determine whether the data structures in the cohorts or the dataset are anomalous, the outputs, e.g., the scores generated by each model 202A-H, may be transmitted to analytics module 204. Analytics module 204 may receive scores from one, all, or a subset of models 202A-H that anomaly detection framework 108 uses to determine the anomaly in the data structures. Analytics module 204 may aggregate the score from one, all, or a subset of models 202A-H into an aggregate score to determine whether data structures include anomalous data. The determination may be based on an anomaly score threshold. For example, suppose models 202A-D each determine that the data structure is an anomalous data structure. In this case, analytics module 204 may determine that the data structure includes anomalous data. In another example, suppose models 202A-B determine the data structure includes anomalous data, but models 202C-D did not identify an anomaly in the data structure. In this case, if the anomaly score threshold is above the score generated from models 202A-B, analytics module 204 may not identify an anomaly. In some instances, the models 202A-H may be assigned an accuracy weight and have the score adjusted by the accuracy weight. The accuracy weight may assign greater weight to more accurate models. The analytics module 204 may then adjust the score generated by one, all, or a subset of models 202A-H by accuracy weight prior to aggregating the scores.

In some embodiments, if analytics module 204 determines an anomaly in the data structure, analytics module 204 may pass the information associated with the data structure to alert module 206. Alert module 206 may generate an alert 208 that identifies an anomaly in the data structure. The alert 208 may be in a form of a message that is transmitted over network 102 of FIG. 1, an email, a text message, and the like. In some instances, the alert may include information associated with the data structures which models 202A-H identified to have parameters that are anomalous. Example information may be anomalous parameters, the reason for the anomaly, and the like.

In some embodiments, alert 208 may activate an icon on a display screen of a computing device 104. For example, when an email that includes an alert arrives at an email application configured to execute on a computing device 104, the email may active the email application and cause the email application to display an icon indicating that an email with an alert has been received at the computing device 104. In another embodiment, the alert may cause the computing device 104 to emit a sound, vibrate, or generate another indication indicating the alert 208 with an anomaly arrived on computing device 104.

FIG. 5 is a simplified diagram of a method 500 for determining an anomaly in data structures of a dataset, according to some embodiments. One or more of the processes 502-514 of method 500 may be implemented, at least in part, in the form of executable code stored on a non-transitory, tangible, machine-readable media that when run by one or more processors may cause the one or more processors to perform one or more of the processes 502-514. Method 500 may iterate through each data structure in the dataset to determine whether the parameters in each data structure include anomalous data.

At process 502, a dataset is received. For example, anomaly detection framework 108 may receive a dataset from one or more data sources 110. The dataset may include structured data, such as network data, transaction data, market data, securities, funds, and the like. The data structures in the dataset may include parameters that anomaly detection framework 108 may analyze for anomalies.

At process 504, a first anomaly detection output is generated for a data structure in the dataset using a first model. For example, anomaly detection framework 108 may use model 202A to generate the first anomaly detection output. The first anomaly detection output may be a score that indicates whether the data structure includes or does not include an anomaly as discussed in FIG. 6 below.

At process 506, a second anomaly detection output is generated for the data structure using a second model. For example, anomaly detection framework 108 may use model 202B to generate the second anomaly detection output. The second anomaly detection output may be a score that indicates whether the data structure includes or does not include an anomaly as discussed in FIG. 7 below.

At process 508, a third anomaly detection output is generated for the data structure using a third model. For example, anomaly detection framework 108 may use model 202C to generate the third anomaly detection output. The third anomaly detection output may be a score that indicates whether the data structure includes or does not include an anomaly as discussed in FIG. 8 below.

At process 510, a fourth anomaly detection output is generated for the data structure using a fourth model. For example, anomaly detection framework 108 may use model 202D to generate the fourth anomaly detection output. The fourth anomaly detection output may be a score that indicates whether the data structure includes or does not include an anomaly as discussed in FIG. 9 below.

At process 512, an anomaly in the data structure is detected. For example, anomaly detection framework 108 may determine that the data structure includes an anomaly based on a combination of the one or more of the first anomaly detection output, the second anomaly detection output, the third anomaly detection output, and the fourth anomaly detection output.

At process 514, an alert is generated. For example, anomaly detection framework 108 may generate an alert, such as a message, an email, a text, and the like that indicates that the data structure includes an anomaly.

Figure 6:
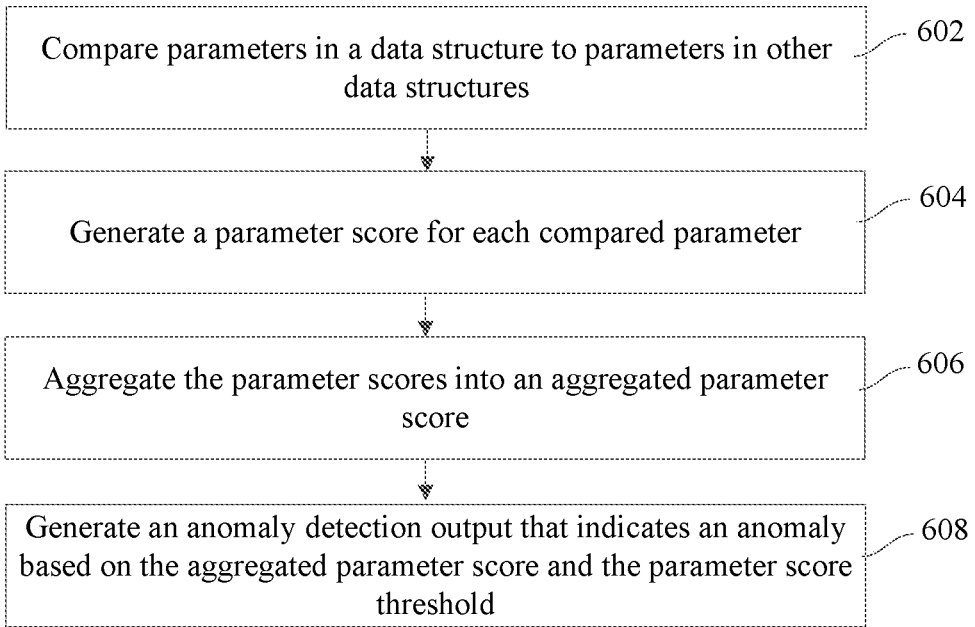
FIG. 6 is a simplified diagram of a method for determining an anomaly in data using a scoring model, according to some embodiments.

FIG. 6 is a simplified diagram of a method 600 for determining an anomaly in a data structure using a scoring model, according to some embodiments. One or more of the processes 602-608 of method 600 may be implemented, at least in part, in the form of executable code stored on a non-transitory, tangible, machine-readable media that when run by one or more processors may cause the one or more processors to perform one or more of the processes 602-608. Method 600 may iterate through each data structure in the dataset to determine whether the data in each data structure is anomalous.

At process 602, parameters are compared. For example, model 202A compares parameters in the data structure against parameters from other data structures to determine if the parameters in the data structure are outliers. The parameters used in the comparison, the number of parameters for comparison, and the type of the parameters for comparison may be predefined in, for example, a configuration file or stored within model 202A. The parameters that may be considered to be outliers when the values of the parameters are within, e.g., the five percent of the worst values for the parameters.

At process 604, parameters are scored. For example, model 202A may generate a parameter score for each parameter that the comparison in process 602 identifies as an outlier parameter. The parameter score may indicate whether the value of the parameter is an anomaly. For example, when the parameter is within the five percent of the worst values, model 202A may generate a score indicated the parameter includes an anomalous value.

At operation 606, the scores are aggregated. For example, model 202A may aggregate the parameter scores generated in process 604 into an aggregated parameter score.

At operation 608, an anomaly detection output is generated. For example, model 202A may generate an anomaly detection output. If the aggregated parameter score is above a predefined parameter score threshold, the anomaly detection output may indicate that the data structure includes an anomaly. Otherwise, anomaly detection output may indicate that the data structure does not an anomaly.

FIG. 7 is a simplified diagram of a method 700 for determining an anomaly in a data structure using an isolation forest model, according to some embodiments. One or more of the processes 702-716 of method 700 may be implemented, at least in part, in the form of executable code stored on a non-transitory, tangible, machine-readable media that when run by one or more processors may cause the one or more processors to perform one or more of the processes 702-716. Method 700 may generate a random forest of trees and pass the parameters in each data structures in the dataset through the trees to determine whether the data in each data structure is anomalous.

At process 702, parameters for determining an anomaly are selected. The parameters may be selected from a configuration file or stored within model 202B.

At process 704, minimum and maximum values for parameters are determined. For example, model 202B determines the minimum and maximum values for the parameters selected in process 702.

At process 706, random forest of trees is built using random splits between the minimum and maximum values of the parameters. For example, model 202B randomly builds a random forest of trees by recursively and randomly splitting values between the minimum and maximum values of the selected parameters. In some embodiments, random forest of trees may be built using a historical dataset.

At process 708, selected parameters are isolated. For example, model 202B may receive a dataset from data source 110 and isolate each selected parameter of a data structure and other data structures in the dataset by passing the selected parameters through the random forest of trees.

At process 710, the path lengths from the root node of the trees to the end node of the trees for each selected parameter in the data structure and the selected parameters in other data structures are determined. For example, for each selected parameter in the data structure, model 202B determines the path lengths in the trees. Model 202B also determines the paths lengths in the trees of each selected parameter in other data structures. Model 202B may average the path lengths of the selected parameters of the other data structures.

At process 712, the outlier parameters are determined. For example, model 202B may determine outlier selected parameters in the data structure by comparing the lengths of the paths determined from the parameters associated with the data structure and the paths determined from the selected parameters of other data structures. Model 202B may determine the outlier parameters in the data structure as the parameters that have shorter path lengths than the average path lengths of the parameters from the other data structures.

At process 714, the parameter score is generated. For example, model 202B may generate a parameter score based on the number of outlier parameters. The parameter score may indicate the number of the selected parameters that are outlier parameters in the data structure.

At process 716, an anomaly detection output is generated. For example, model 202B may generate an anomaly detection output. If the parameter score is above a predefined parameter score threshold, the anomaly detection output may indicate that the data in the data structure is an anomaly. Otherwise, anomaly detection output may indicate that the data structure is not an anomaly.

Figure 8:
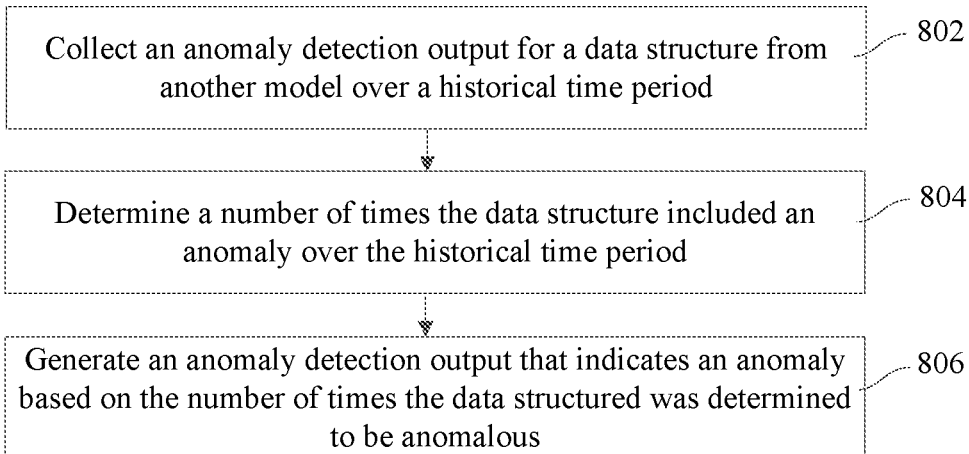
FIG. 8 is a simplified diagram of a method for determining an anomaly in data using a historical isolation forest model, according to some embodiments.

FIG. 8 is a simplified diagram of a method 800 for determining an anomaly in a data structure using a historical isolation forest model, according to some embodiments. One or more of the processes 802-806 of method 800 may be implemented, at least in part, in the form of executable code stored on a non-transitory, tangible, machine-readable media that when run by one or more processors may cause the one or more processors to perform one or more of the processes 802-806. Method 800 may iterate through each data structure in the dataset to determine whether the parameters in each data structure include anomalous data.

At process 802, second anomaly detection outputs over a historical time period are collected. For example, model 202C may collect the second anomaly detection outputs of model 202B over a historical time period, such as over a previous month or from today to the previous n number of days. Although the example in method 800 applies to model 202B, any other anomaly detection model may be used.

At process 804, a number of times a data structure includes an anomaly over the historical time period is determined. For example, model 202C may determine the number of times model 202B have found the data structure to include anomalous data over the historical time period.

At process 806, an anomaly detection output is generated. For example, model 202C may generate an anomaly detection output. If the number of times a data structure is determined to be anomalous over the historical time period is above a predefined historical time threshold, the anomaly detection output may indicate that the data structure includes an anomaly. Otherwise, the anomaly detection output may indicate that the data structure does not include an anomaly.

FIG. 9 is a simplified diagram of a method 900 for determining an anomaly in a data structure using a time series anomaly detection model, according to some embodiments. One or more of the processes 902-910 of method 900 may be implemented, at least in part, in the form of executable code stored on a non-transitory, tangible, machine-readable media that when run by one or more processors may cause the one or more processors to perform one or more of the processes 902-910. Method 900 may iterate through each data structure in the dataset to determine whether the parameters in each data structure include anomalous data.

At process 902, parameters for determining an anomaly are selected. The parameters may be selected from a configuration file or stored within a time series anomaly detection model, such as model 202D.

At process 904, historical distributions of the selected parameters are determined. For example, model 202D may retrieve historical distributions of the selected parameters over a predefined historical time period, such as the past three months. Alternatively, model 202D may retrieve the historical datasets that include the selected parameters over the historical time period and generate historical distributions of the selected parameters.

At process 906, expected ranges for the parameters are determined. For example, model 202D may determine the expected ranges for the parameters to be within a predetermined range of values in the distribution. For example, the expected ranges may be between the 25 percent and 75 percent of values in the distribution.

At process 908, selected parameters in the data structure are compared against the respective distributions of the selected parameters to determine the outliers. For example, model 202D may compare the values of the selected parameters in the data structure to the expected ranges in the historical distributions of the selected parameters to determine whether the parameters are within or outside the expected ranges. If the values of the selected parameters are outside of the corresponding expected ranges in the distributions, the parameters are outliers.

At process 910, an anomaly detection output is generated. For example, model 202D may generate an anomaly detection output. If the number of selected parameters that are outside of the expected range is higher than a predefined threshold of parameters, the anomaly detection output may indicate that the parameters in the data structure include an anomaly. Otherwise, anomaly detection output may indicate that the data structure is not an anomaly.

Going back to FIG. 2, in some embodiments, the anomaly detection framework 108 may be used to identify securities and funds that may be used for a loan or collateral. In some embodiments, anomaly detection framework 108 may use anomaly detection models 202A-D to identify securities or funds that include anomalies. As discussed above, once a security or fund is identified as having an anomaly, anomaly detection framework 108 may generate an anomaly alert 208 which indicates that the security or fund may be investigated further before the security or fund may be used for a loan or a collateral in the future. In some embodiments, data sources 110 for securities may include control data generated by various trading companies. The anomaly detection framework 108 may receive the control data from data sources 110 as data structures where each data structure identifies a security or a fund. Data processor 201 may divide the securities or funds into cohorts according to various parameters relating to the lending activity for securities or funds. For example, data processor 201 may categorize funds as large and small funds. Data processor 201 may categorize securities or funds into seasoned and not seasoned securities or funds based on the lending age of the securities or funds. Data processor 201 may categorize the lending activity of the securities or funds to determine if the securities or funds are loaned regularly or irregularly. A regularly loaned security or fund may be loaned more than a predefined number of times over a predefined time interval, while an irregularly loaned security or fund may be loaned less than the predefined number of times over the predefined time interval. Data processor 201 may also categorize securities or funds as hard or easy to borrow. The securities or funds that are categorized as hard to borrow have certain asset level characteristics that meet their respective thresholds, which are determined internally. For example, funds that include all or a subset of assets with a lending or borrowing activity above a predefined threshold may be categorized as easy to borrow, and funds that have all or a subset of assets below the predefined threshold may be categorized as hard to borrow. Once data processor 201 generates cohorts from the security or fund dataset according to the criteria above, data processor 201 may pass the cohorts to models 202A-D for processing as discussed above.

In some embodiments, model 202A may have an example parameter score threshold that is five. Once the parameters in the fund exceed the threshold, the fund may be designated as anomalous. In some embodiments, model 202B may be configured to generate a random forest of trees using the lending parameters of those funds. In some embodiments, the random forest of trees may be generated to target 5% of funds as anomalous funds. In some embodiments, model 202C may have a historical time period that is ten days. In some embodiments, model 202D (the time series model) may use a subset of parameters to determine an anomaly. Additionally, the historical time period for determining a distribution may be three months. Finally, the deviation in the distribution that generates an expected range for non-anomalous funds may be between 25% and 75% of the distribution.

Figure 10:
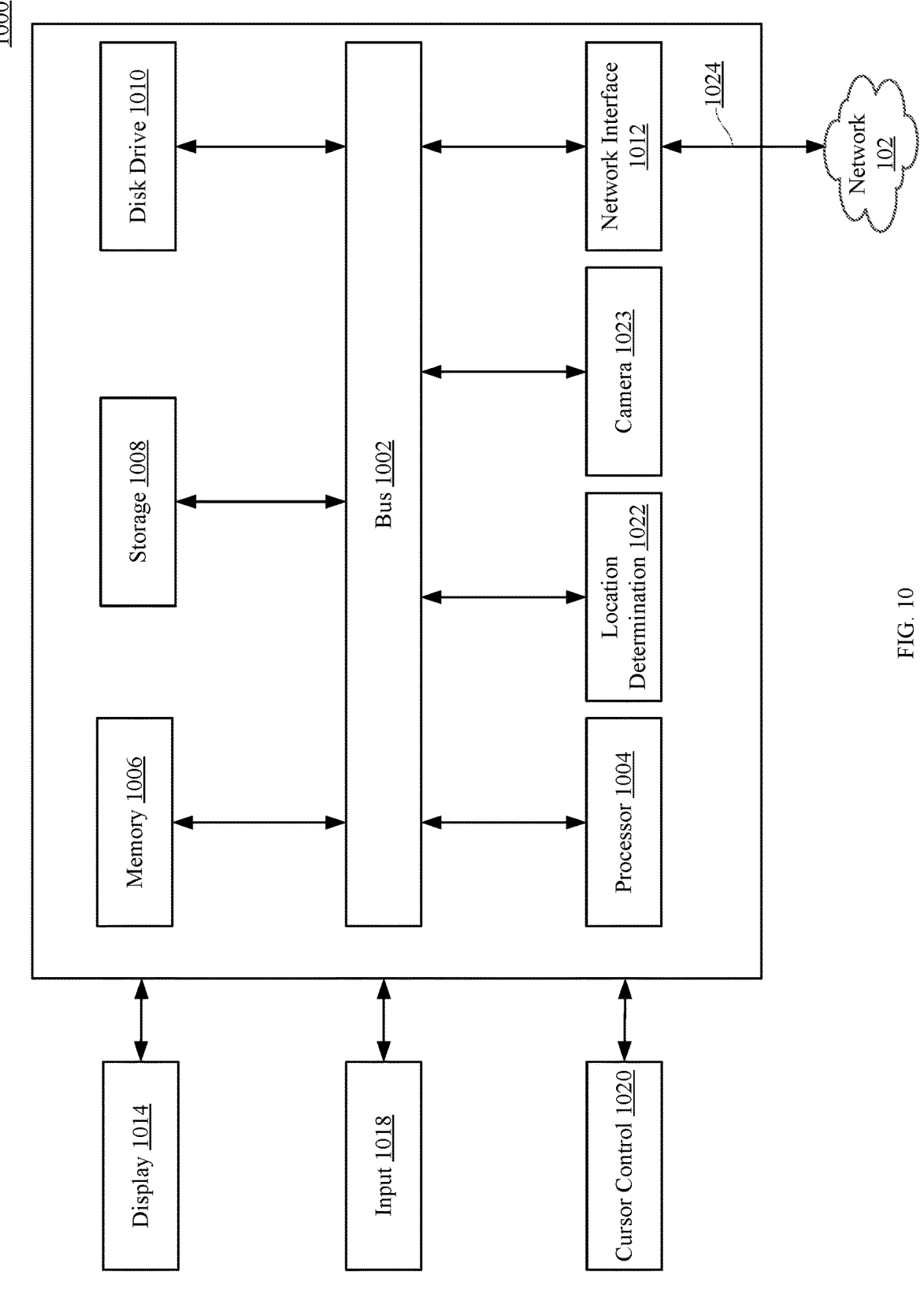
FIG. 10 is an embodiment of a computer system suitable for implementing, the systems and methods described in FIGS. 1-9.

Referring now to FIG. 10 an embodiment of a computer system 1000 suitable for implementing, the systems and methods described in FIGS. 1-9 is illustrated.

In accordance with various embodiments of the disclosure, computer system 1000, such as a computer and/or a server, includes a bus 1002 or other communication mechanism for communicating information, which interconnects subsystems and components, such as a processing component 1004 (e.g., processor, micro-controller, digital signal processor (DSP), graphics processing unit (GPU), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the disclosure, the computer system 1000 performs specific operations by the processing component 1004 executing one or more sequences of instructions contained in the memory component 1006, such as described herein with respect to the mobile communications devices, mobile devices, and/or servers. Such instructions may be read into the system memory component 1006 from another computer readable medium, such as the static storage component 1008 or the disk drive component 1010. In other embodiments, hard-wired circuitry may be used in place of or in combination with software instructions to implement the disclosure.

Logic may be encoded in a computer readable medium, which may refer to any medium that participates in providing instructions to the processing component 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 1000. In various other embodiments of the disclosure, a plurality of the computer systems 1000 coupled by a communication link 1024 to the network (e.g., such as a LAN, WLAN, PTSN, and/or various other wired or wireless networks, including telecommunications, mobile, and cellular phone networks) may perform instruction sequences to practice the disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:
1. A system, comprising:
   a memory configured to store a plurality of anomaly detection models; and a processor coupled to the memory and configured to perform operations, the operations comprising:
   receiving data structures in a dataset transmitted by a computing network from a plurality of data sources coupled to the computer network, wherein the data structures include parameters storing transaction data generated by the plurality of data sources;
   determining a first anomaly detection output for a data structure in the data structures using a first anomaly detection model in the plurality of anomaly detection models by:
      comparing first parameters associated with the data structure to other first parameters associated with other data structures;
      generating a parameter score for each first parameter in the first parameters based on the comparison;
      aggregating parameter scores for the first parameters into an aggregated parameter score; and
      generating the first anomaly detection output based on the aggregated parameter score;
   determining a second anomaly detection output for the data structure using a second anomaly detection model in the plurality of anomaly detection models by:
      providing a random forest of trees generated using minimum and maximum values of second parameters in the dataset;
      isolating second parameters in the data structure using the random forest of trees by passing the second parameters in the data structure through trees in the random forest of trees;
      determining path lengths of the second parameters of the data structure through the trees; and
      generating the second anomaly detection output based on the path lengths;
   determining a third anomaly detection output for the data structure using a third anomaly detection model in the plurality of anomaly detection models by:
      generating third anomaly detection outputs over a historical time period; and
      determining the third anomaly detection output based on a number of times second anomaly detection outputs indicated an anomaly in the data structure over the historical time period; and
   determining a fourth anomaly detection output for the data structure in the dataset using a fourth anomaly detection model in the plurality of anomaly detection models by:
      identifying fourth parameters from parameters associated with the dataset;
      generating distributions of the fourth parameters over a second historical time period;
      determining expected range of values in the distributions using the fourth parameters; and
      generating the fourth anomaly detection output based on fourth parameters in the data structure and the expected range of values;
   determining that the data structure includes the anomaly based on the first anomaly detection output, the second anomaly detection output, the third anomaly detection output, and the fourth anomaly detection output; and
   generating an alert for the data structure based on the anomaly; and
   transmitting the alert to a computing device, wherein the alert, upon receipt at the computing device, activates an icon on a display screen of the computing device indicating that the alert with the anomaly has been received at the computing device.

2. The system of claim 1, wherein the generating first anomaly detection output is based on the aggregated parameter score being above a parameter score threshold.

3. The system of claim 1, wherein determining the second anomaly detection output further comprises:

determining the minimum and maximum values for the second parameters in the dataset; and generating the trees in the random forest of trees by randomly splitting the minimum and maximum values to generate nodes in the trees.

4. The system of claim 1, wherein determining the second anomaly detection output further comprises:

determining path lengths of the second parameters in the dataset;

averaging the path lengths of the second parameters in the dataset; and further generating the second anomaly detection output based on the path lengths of the data structure being less than the average path lengths.

5. The system of claim 1, wherein generating the fourth anomaly detection output further comprises:

determining that a value of at least one fourth parameter in the data structure is outside of the expected range of values.

6. The system of claim 1, further comprising:

generating cohorts from the dataset using fifth parameters in data structures of the dataset; and processing anomalies in data structures of each cohort.

7. The system of claim 1, wherein the dataset includes computer network data.

8. The system of claim 1, wherein the dataset includes funds available for lending.

9. The system of claim 1, wherein the dataset includes transactions and anomalies include fraudulent transactions in the dataset.

10. A method, comprising:

receiving a dataset including data structures storing parameters over a computer network, wherein a ground truth or expected parameter values for the parameters are unknown;

selecting, based on an available memory of a computing device, a first anomaly detection model, a second anomaly detection model, a third anomaly detection model, and a fourth anomaly detection model from a plurality of anomaly detection models;

determining, using at least one processor and the available memory, a first anomaly detection output for a data structure in the dataset using the first anomaly detection model in the plurality of anomaly detection models and first parameters in the data structure;

determining, using the at least one processor and the available memory, a second anomaly detection output for the data structure using the second anomaly detection model in the plurality of anomaly detection models and second parameters in the data structure;

determining, using the at least one processor and the available memory, a third anomaly detection output using the third anomaly detection model in the plurality of anomaly detection models and third parameters in the data structure;

determining, using the at least one processor and the available memory, a fourth anomaly detection output using the fourth anomaly detection model in the plurality of anomaly detection models and fourth parameters in the data structure; and determining that the data structure is an anomalous data structure based on the first anomaly detection output, the second anomaly detection output, the third anomaly detection output, and the fourth anomaly detection output, wherein determining using the first anomaly detection model, the second anomaly detection model, the third anomaly detection model, and the fourth anomaly detection model is performed in parallel.

11. The method of claim 10, further comprising:

selecting the first anomaly detection model, the second anomaly detection model, the third anomaly detection model, and the fourth anomaly detection model from a pool of the plurality of anomaly detection models.

12. The method of claim 10, wherein the first anomaly detection output for the data structure in the dataset is determined by:

comparing the first parameters associated with the data structure to other first parameters associated with other data structures in the dataset;

generating a parameter score for each first parameter in the first parameters in the data structure based on the comparison;

aggregating parameter scores into an aggregated parameter score; and generating the first anomaly detection output based on the aggregated parameter score.

13. The method of claim 10, wherein the second anomaly detection output for the data structure in the data structures is determined by:

providing a random forest of trees generated using minimum and maximum values of a training dataset;

isolating the second parameters in the data structure using the random forest of trees by passing the second parameters in the data structure through trees in the random forest of trees;

determining path lengths of the second parameters of the data structure through the trees; and generating the second anomaly detection output based on the path lengths.

14. The method of claim 10, wherein the third anomaly detection output for the data structure in the data structures is determined by:

accessing second anomaly detection outputs stored over a historical time interval; and determining the third anomaly detection output based on a number of times the second anomaly detection outputs indicated an anomaly in the data structure.

15. The method of claim 10, wherein the fourth anomaly detection output for the data structure in the dataset is determined by:

generating distributions for fourth parameters in datasets over a historical time period;

determining expected range of values in the distributions using the fourth parameters in the datasets;

comparing the fourth parameters in the data structure to the expected range of values; and generating the fourth anomaly detection output based on the comparison.

16. The method of claim 10, wherein the dataset is a fund dataset received over a network from multiple data sources.

17. The method of claim 10, further comprising:

dividing the dataset into cohorts according to fifth parameters.

18. The method of claim 10, further comprising:

generating an alert that includes information associated with the anomalous data structure, wherein the alert includes one or more of the first anomaly detection output, the second anomaly detection output, the third anomaly detection output, and the fourth anomaly detection output.

19. The method of claim 18, further comprising:

transmitting the alert in an email that activates an icon on a computing display as an indication of the anomalous data structure.

20. A non-transitory computer readable medium storing instruction thereon, that when executed by a processor cause the processor to perform operations for detecting an anomaly in at least one data structure of a computer network, the operations comprising:

receiving a dataset including data structures over the computer network, the data structures storing parameters wherein a ground truth or expected parameter values for the parameters are unknown;

dividing the data structures in the dataset into a plurality of cohorts using a subset of the parameters in the data structures, wherein at least one parameter in the subset of parameters is an Internet Protocol address;

selecting a plurality of anomaly detection models;

processing, using the plurality of anomaly detection models executing in parallel, data structures in each cohort in the plurality of cohorts, wherein each anomaly detection model generates anomaly detection scores for the data structures of each cohort in the plurality of cohorts;

aggregating an anomaly detection score in the anomaly detection scores for each data structure;

generating an alert for the at least one data structure based on the corresponding aggregated anomaly detection score; and transmitting the alert, wherein the alert, upon receipt at a computing device, activates an icon on a display screen of the computing device indicating that the alert with the anomaly detection score has been received at the computing device.

\* \* \* \* \*